(12) United States Patent
Shirono

(10) Patent No.: US 8,059,158 B2
(45) Date of Patent: Nov. 15, 2011

(54) PHOTOGRAPHING APPARATUS

(75) Inventor: Masahiro Shirono, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 515 days.

(21) Appl. No.: 12/136,224

(22) Filed: Jun. 10, 2008

(65) Prior Publication Data
US 2009/0002502 A1    Jan. 1, 2009

(30) Foreign Application Priority Data
Jun. 26, 2007 (JP) .................................. 2007-167168

(51) Int. Cl.
*H04N 5/228* (2006.01)
(52) U.S. Cl. .............. 348/208.7; 348/208.99; 348/208.4
(58) Field of Classification Search ............... 348/208.4, 348/208.7
See application file for complete search history.

(56) References Cited

U.S. PATENT DOCUMENTS

| | | | | |
|---|---|---|---|---|
| 6,064,827 A * | 5/2000 | Toyoda | ............................ | 396/55 |
| 6,539,174 B1 | 3/2003 | Tanii et al. | | |
| 7,436,435 B2 * | 10/2008 | Wada | ......................... | 348/208.4 |
| 2006/0056829 A1 * | 3/2006 | Hirota et al. | ..................... | 396/54 |
| 2007/0257989 A1 * | 11/2007 | Shirono | .................... | 348/208.99 |

FOREIGN PATENT DOCUMENTS

| | | |
|---|---|---|
| JP | 2001-147458 A | 5/2001 |
| JP | 2006-128621 A | 5/2006 |
| JP | 2007-140204 A | 6/2007 |

OTHER PUBLICATIONS

Office Action established for JP 2007-167168 (Jul. 26, 2011).

* cited by examiner

*Primary Examiner* — Luong T Nguyen
(74) *Attorney, Agent, or Firm* — Drinker Biddle & Reath LLP

(57) ABSTRACT

A photographing apparatus for reducing the effect of shake on an image. The photographing apparatus includes an image pickup device, an image pickup device stage supporting the image pickup device and moving the image pickup device, a driving force generating portion for driving the image pickup device stage and moving the image pickup device stage, a guide portion contacting the image pickup device stage and limiting the direction in which the image pickup device stage moves, a first elastically pressing portion elastically pressing the driving force generating portion to consistently bring the driving force generating portion into contact with the operating portion of the image pickup device stage, and a second elastically pressing portion elastically pressing the image pickup device stage to bring the image pickup device stage into contact with the guide portion.

23 Claims, 16 Drawing Sheets

PHOTOGRAPHING APPARATUS

CROSS-REFERENCE TO RELATED PATENT APPLICATION

This application claims the benefit of Japanese Patent Application No. 2007-167168, filed on Jun. 26, 2007, in the Japanese Intellectual Property Office, the entire content of which is incorporated herein by reference.

BACKGROUND OF THE INVENTION

1. Field of the Invention

The present invention relates to a photographing apparatus. More particularly, the present invention relates to a photographing apparatus for minimizing the effect of shaking on an image.

2. Description of the Related Art

Photographing apparatuses, such as still cameras and video cameras, include an image pickup device and convert light emitted to the image pickup device into an image signal.

The photographing apparatuses may include an image shake correction device to prevent shake of an image. The image shake correction device detects vibrations applied to the photographing apparatus and moves the image pickup device according to the detection result to prevent shake of an image formed on the image pickup device.

Generally, the image shake correction device makes the image pickup device move along an X-axis and a Y-axis, which perpendicularly intersect each other, according to the movement of the photographing apparatus.

An image shake correction device embedded in a photographing apparatus is disclosed in Japanese Patent Application No. 2006-128621 by the inventor of the present invention.

FIG. 1 is a plan view of a conventional image shake correction device 10. FIG. 2 is a cross-sectional view taken along line I-I in FIG. 1.

Referring to FIG. 1, a photographing apparatus includes a charge coupled device (CCD) image sensor 12, and the conventional image shake correction device 10 includes a base plate 80 fixed to a main body of the photographing apparatus, a slider 20 installed on the base plate 80, and a CCD base 90 installed on the slider 20 having the CCD image sensor 12 to be mounted thereon.

The slider 20 and the CCD base 90 constitute an image pickup device stage. The slider 20 can move in an X direction with respect to the base plate 80, and the CCD base 90 can move in a Y direction with respect to the slider 20.

Piezoelectric actuators 40 and 42, disposed in a driving force generating portion, include piezoelectric elements. When active portions, which are formed at front ends of the piezoelectric actuators 40 and 42, elliptically move, the image pickup device stage contacting the active portions moves.

The piezoelectric actuator 40 and a support portion 56 are fixedly installed on the base plate 80, the active portion is formed at the front end of the piezoelectric actuator 40 contacts a protrusion 32 protruding from the slider 20, and a ball bearing 36 is inserted between the protrusion 32 and the support portion 56.

A ball holder 60 is fixedly installed on the base plate 80, and a long-hole groove 62 (see FIG. 2) is formed in the ball holder 60 along a virtual straight line P extending from the protrusion 32.

A long-hole groove 22 is formed in a surface of the slider 20 facing the long-hole groove 62, and a ball bearing 64 is arranged between the two long-hole grooves 62 and 22. The long-hole grooves 62 and 22 and the ball bearing 64 constitute a guide portion. Accordingly, the slider 20 can move along the straight line P due to the driving force of the piezoelectric actuator 40.

The piezoelectric actuator 42 and a support portion 92 are fixedly installed on the CCD base 90, the active portion is formed at the front end of the piezoelectric actuator 42 contacts a protrusion 34 of the slider 20, and a ball bearing 38 is inserted between the protrusion 34 and the support portion 92.

A long-hole groove (not shown) is formed in the CCD base 90 along a virtual straight line Q extending from the protrusion 34. A long-hole groove 24 is formed in a surface of the slider 20 facing the long-hole groove of the CCD base 90, and a ball bearing 96 is arranged between the two long-hole grooves. The two long-hole grooves and the ball bearing 96 constitute a guide portion. Accordingly, the CCD base 90 can move along the straight line Q due to the driving force of the piezoelectric actuator 42.

A ball bearing 91 is inserted into a bearing groove 26 and disposed between the CCD base 90 and the slider 20. A ball bearing 84 is inserted into a bearing groove 97 and disposed between the slider 20 and the base plate 80.

A ball bearing 93 is inserted into a bearing groove 28 and disposed between the CCD base 90 and the slider 20. A ball bearing 86 is inserted into a bearing groove 98 and disposed between the slider 20 and the base plate 80. The CCD base 90 is attracted to the base plate 80 by a magnet 52.

According to the conventional image shake correction device 10, either the straight line P connecting an operating portion of the piezoelectric actuator 40 and the guide portion, or the straight line Q connecting an operating portion of the piezoelectric actuator 42 and the guide portion, passes over the CCD image sensor 12. As a result, since a distance between the center of the CCD image sensor 12 and the operating portions of the piezoelectric actuators 40 and 42 is shortened, the conventional image shake correction device 10 can reduce a moment caused by the CCD image sensor 12, thereby more efficiently following vibrations caused by hand shake.

However, as described hereinafter with reference to FIGS. 2 and 3, the photographing apparatus including the conventional image shake correction device 10 may fail to capture an image in which image shake is prevented with high precision.

FIGS. 3 and 6 are plan views of the conventional image shake correction device 10. FIG. 4 is a cross-sectional view taken along line II-II of FIG. 3. FIGS. 5 and 7 are enlarged plan views of parts of the conventional image shake correction device 10.

Referring to FIG. 3, if the slider 20 moves in a negative direction of an X-axis, the ball bearing 36 rolls in the negative direction of the X-axis, and thus an operation point of the driving force of the piezoelectric actuator 40 and a position of the ball bearing 36 do not match each other. In this case, pressure from the piezoelectric actuator 40 causes a rotating moment around the ball bearing 36 in an X-Y plane of the CCD image sensor 12.

Therefore, referring to FIG. 4, the long-hole groove 22 of the slider 20 contacts a side surface of the ball bearing 64, the pressure is further applied to the slider 20, and the slider 20 tends to climb on top of the ball bearing 64. As a result, either the slider 20 or the CCD base 90 moves along a Z-axis, which is perpendicular to the X and Y-axes, despite the magnet 52 attracting the CCD base 90 to the base plate 80.

For example, referring to FIGS. 5 and 7, each of widths of the long-hole grooves 62 and 22 along the Y-axis are slightly greater than a diameter of the ball bearing 64 so that the ball bearing 64 can rotate. Therefore, the slider 20 can move not only along the X-axis, but also along the Y-axis as much as a difference between each of the widths of the long-hole grooves 62 and 22 and the diameter of the ball bearing 64.

Accordingly, referring to FIGS. 4 and 5, when the slider 20 moves in the negative direction of the X-axis, the slider 20 also moves in a negative direction of the Y-axis with respect to the ball holder 60 according to position relations between the long-hole groove 22 of the slider 20, the long-hole groove 62 of the ball holder 60, and the ball bearing 64.

Also, referring to FIG. 6, if the slider 20 moves in a positive direction of the X-axis, the ball bearing 36 rolls in the positive direction of the X-axis, and thus the operation point of the driving force of the piezoelectric actuator 40 and the position of the ball bearing 36 do not match each other. In this case, pressure from the piezoelectric actuator 40 causes a rotating moment around the ball bearing 36 in the X-Y plane of the CCD image sensor 12. The rotating moment caused when the slider 20 moves in the positive direction of the X-axis is opposite in direction to the rotating moment caused when the slider 20 moves in the negative direction of the X-axis. Position relations between the long-hole groove 22 of the slider 20, the long-hole groove 62 of the ball holder 60, and the ball bearing 64 are shown in FIG. 7. That is, the slider 20 moves in a positive direction of the Y-axis with respect to the ball holder 60.

Comparing FIGS. 3 through 7, a position relation between the piezoelectric actuator 40 and the ball bearing 36 is reversed by the movement of the slider 20 along the X-axis, and a rotating moment around the ball bearing 36 is also reversed. As a result, the slider 20 moves either in the negative or positive direction of the Y-axis. Generally, the difference between each of the widths of the long-hole grooves 62 and 22 along the Y-axis and the diameter of the ball bearing 64 is greater than one pixel of the CCD image sensor 12 due to restrictions such as manufacturing precision. Accordingly, the conventional image shake correction device 10 cannot prevent image shake with high precision because of the movement of the slider 20 along the Y-axis.

For example, as shown in FIG. 3, if the slider 20 moves in the negative direction of the X-axis and the ball bearing 36 extremely moves in the negative direction of the X-axis, the ball bearing 36 deviates very much from the operation point of the piezoelectric actuator 40. In this case, the slider 20 is bent significantly due to the pressure from the piezoelectric actuator 40. As a result, a vibration mode caused by the bending may resonate with vibrations of the piezoelectric actuator.

SUMMARY OF THE INVENTION

The present invention provides a photographing apparatus that can stably move an image pickup device stage and can prevent image shake with high precision.

Accordingly, an embodiment of the present invention provides a photographing apparatus comprising an image pickup device for converting light emitted to an image pickup surface into an electrical signal using photoelectric conversion, an image pickup device stage supporting the image pickup device and moving the image pickup device in a direction parallel or substantially parallel to the image pickup surface, and a driving force generating portion for driving the image pickup device stage by applying a frictional driving force to an operating portion of the image pickup device stage and moving the image pickup device stage in the direction parallel or substantially parallel to the image pickup surface. The photographing apparatus further comprises a guide portion contacting the image pickup device stage and limiting the direction in which the image pickup device stage moves, a first elastically pressing portion that elastically presses the driving force generating portion to consistently bring the driving force generating portion into contact with the operating portion of the image pickup device stage to which the driving force of the driving force generating portion is applied, and a second elastically pressing portion that elastically presses the image pickup device stage in the same or substantially the same direction as a direction in which the first elastically pressing portion elastically presses the driving force generating portion to bring the image pickup device stage into contact with the guide portion.

Accordingly, since the first elastically pressing portion elastically presses the driving force generating portion to consistently bring the driving force generating portion into contact with the operating portion of the image pickup device stage to which the driving force of the driving force generating portion is applied, and the second elastically pressing portion elastically presses the image pickup device stage in the same or substantially the same direction as the direction in which the first elastically pressing portion elastically presses the driving force generating portion to bring the image pickup device stage into contact with the guide portion, the image pickup device stage can be pulled in the same or substantially the same direction, and the image pickup device stage can move stably.

The driving force generating portion may be disposed so that a long axis of the driving force generating portion is perpendicular or substantially perpendicular to the direction in which the image pickup device stage moves, and is parallel or substantially parallel to the image pickup surface of the image pickup device, and the second elastically pressing portion is disposed so that the direction in which the second elastically pressing portion elastically presses the image pickup device stage is perpendicular or substantially perpendicular to the direction in which the image pickup device stage moves, and is parallel or substantially parallel to the image pickup surface of the image pickup device.

The photographing apparatus may further comprise a first fixing member receiving an elastic pressure applied through the image pickup device stage from the first elastically pressing portion, and a first ball bearing inserted between the first fixing member and the image pickup device stage. The guide portion can comprise a second fixing member receiving an elastic pressure applied through the image pickup device stage from the second elastically pressing portion and a second ball bearing inserted between the second fixing member and the image pickup device stage. Substantially V-shaped notches are formed, in the direction in which the image pickup device stage moves, in opposite surfaces of the first fixing member and the image pickup device stage between which the first ball bearing is inserted and in opposite surfaces of the second fixing member and the image pickup device stage between which the second ball bearing is inserted. The second elastically pressing portion may have a partially notched circular shape (C-shape) when viewed in a direction perpendicular or substantially perpendicular to the image pickup surface, wherein an outer peripheral surface of the C-shaped second elastically pressing portion brings the image pickup device stage into contact with the guide portion by elastically pressing the image pickup device stage in the same or substantially the same direction as the direction in which the first elastically pressing portion elastically presses the driving force generating portion.

The second elastically pressing portion may be inserted between the image pickup device stage and a third fixing member that is opposite to a contact portion between the second elastically pressing portion and the image pickup device stage, and the C-shaped second elastically pressing portion may rotate between the image pickup device stage and the third fixing member according to the movement of the image pickup device stage.

Accordingly, since the C-shaped second elastically pressing portion can rotate according to the movement of the image pickup device stage, a frictional force generated at a contact portion between the image pickup device stage and C-shaped second elastically pressing member is a rolling frictional force, not a sliding frictional force.

The image pickup device stage may comprise a protrusion having an operating surface which is parallel or substantially parallel to the direction in which the image pickup device stage moves, and the driving force generating portion contacts the operating surface of the protrusion to which the driving force of the driving force generating portion is applied.

Accordingly, the image pickup device stage can move due to the protrusion contacting the driving force generating portion.

A region with a lower rigidity than that of other regions of the image pickup device stage may be formed at a contact portion between the protrusion and the image pickup device stage. Accordingly, vibrations imparted through the protrusion to the region with the lower rigidity can be reduced.

The region with the lower rigidity may have a notched shape. Hence, the region with the lower rigidity can be easily formed at the image pickup device stage.

The first ball bearing may comprise two balls arranged in the direction in which the image pickup device stage moves.

One of the two balls may be inserted into a substantially V-shaped notch formed in opposite surfaces of the first fixing member and the image pickup device stage, and the remaining one of the two balls may move in a direction perpendicular or substantially perpendicular to the direction in which the image pickup device stage moves and may be inserted into a substantially concave notch formed in the opposite surfaces of the first fixing member and the image pickup device stage in the direction in which the image pickup device stage moves.

Accordingly, a perpendicular or substantially perpendicular position to the image pickup surface of the image pickup device stage is determined by the ball inserted into the substantially V-shaped notch.

A virtual straight line extending from a long axis of the driving force generating portion, which is perpendicular or substantially perpendicular to the direction in which the image pickup device stage moves, may be located between the center lines of the two balls.

Accordingly, the image pickup device stage cannot be bent thanks to a rotating moment caused by a pressure of the driving force generating portion.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
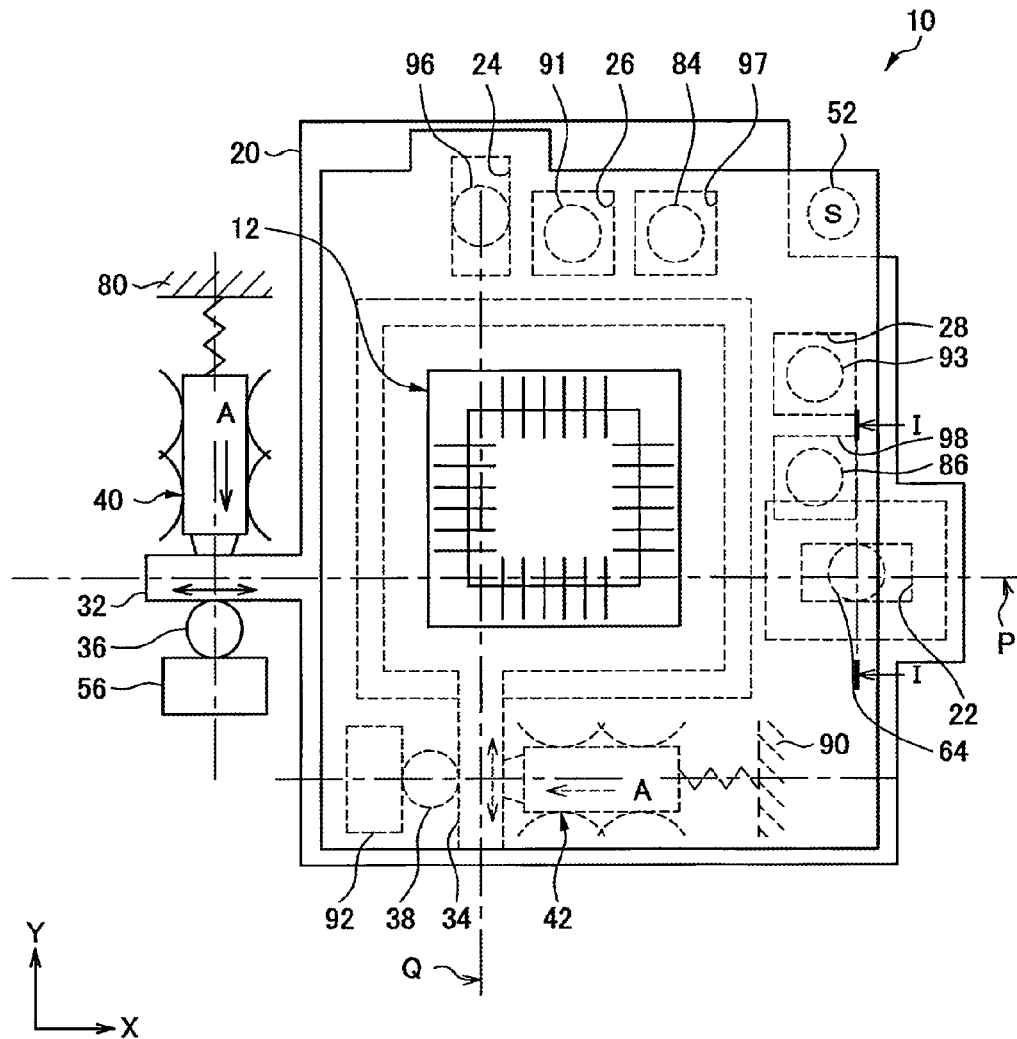
FIG. 1 is a plan view of a conventional image shake correction device.
Figure 2:
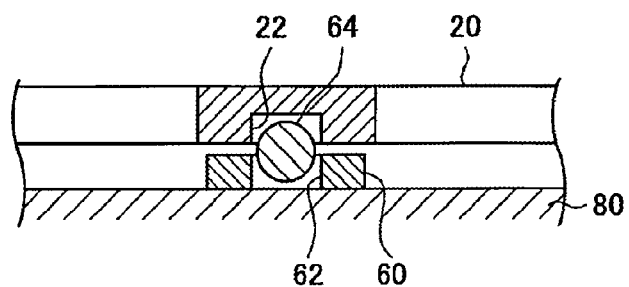
FIG. 2 is a cross-sectional view taken along line I-I of FIG. 1.
Figure 3:
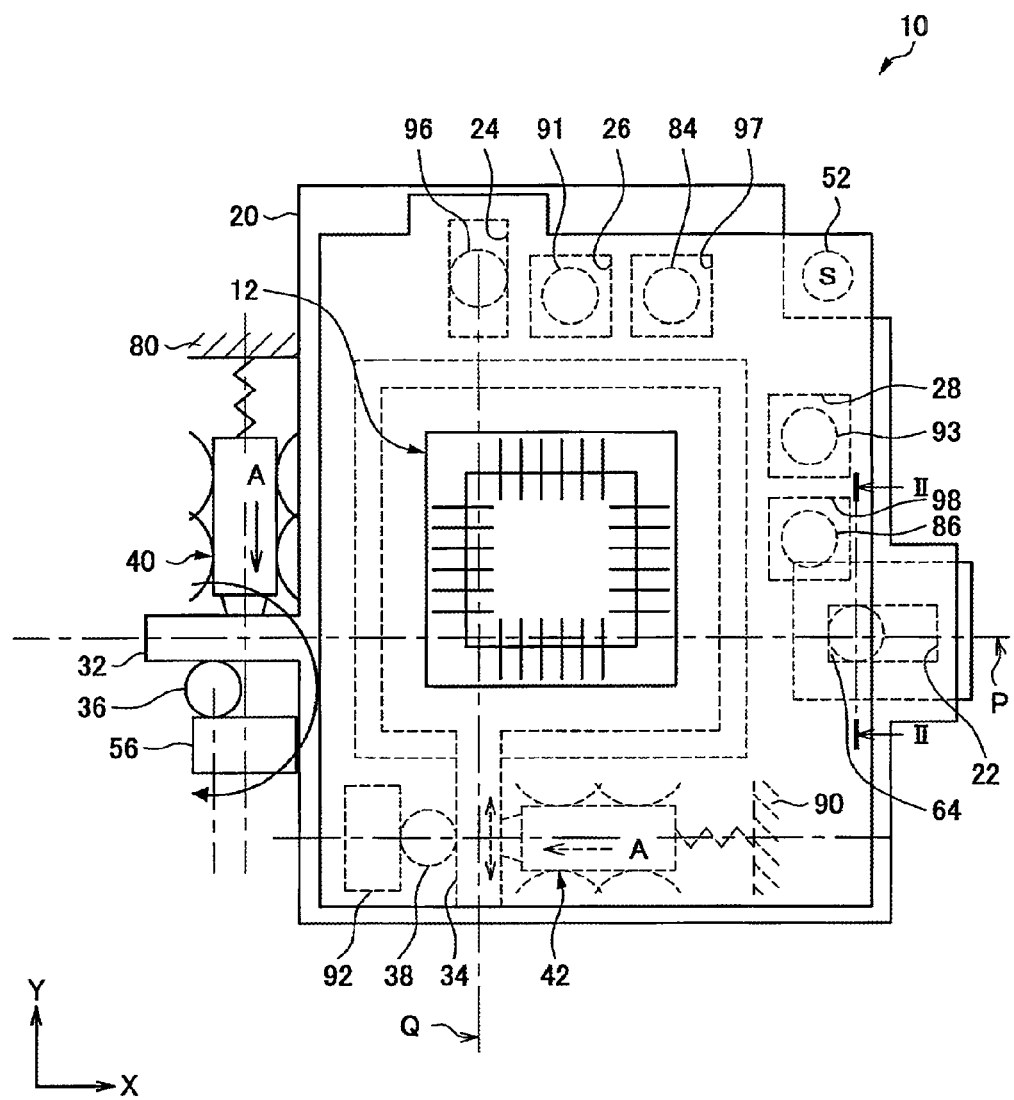
FIG. 3 is a plan view of the conventional image shake correction device of FIG. 1 when a slider moves in a direction.
Figure 4:
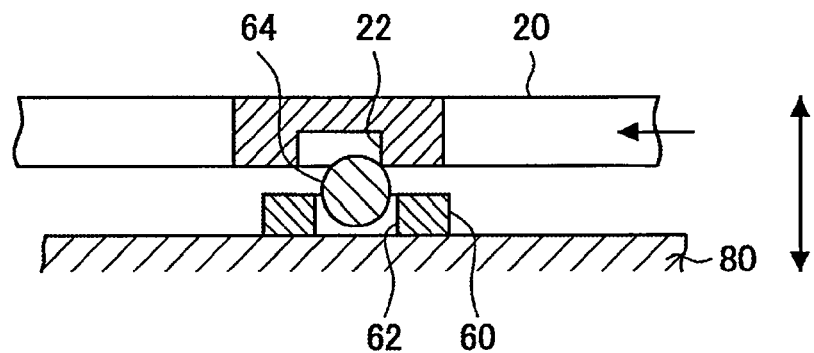
FIG. 4 is a cross-sectional view taken along line II-II of FIG. 3.
Figure 5:
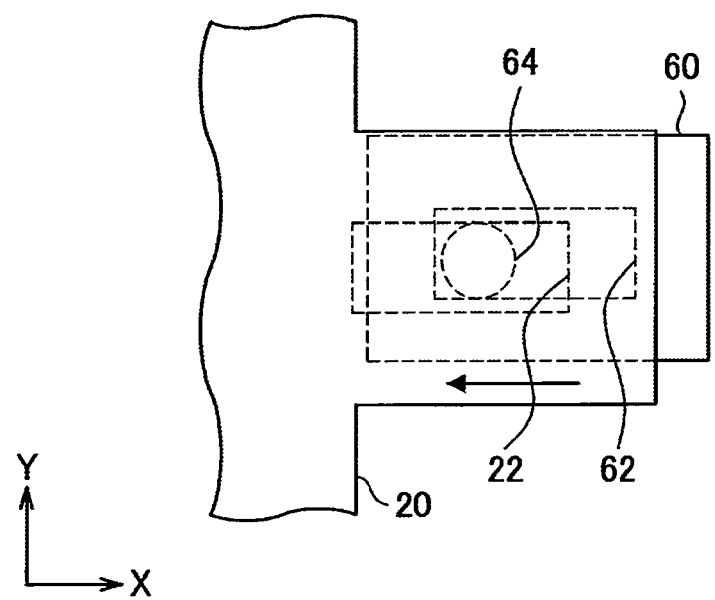
FIG. 5 is an enlarged plan view of a part of the conventional image shake correction device.
Figure 6:
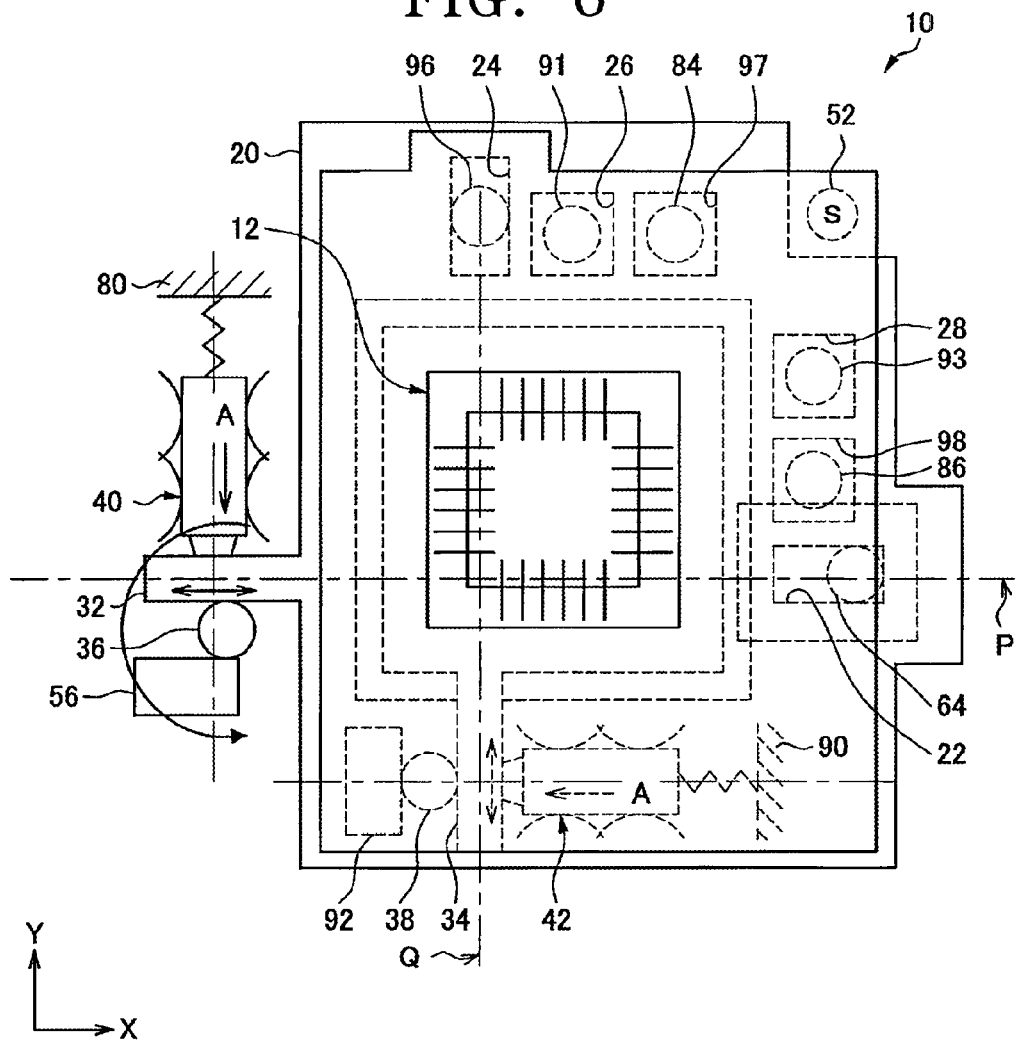
FIG. 6 is a plan view of the conventional image shake correction device of FIG. 1 when the slider moves in another direction.
Figure 7:
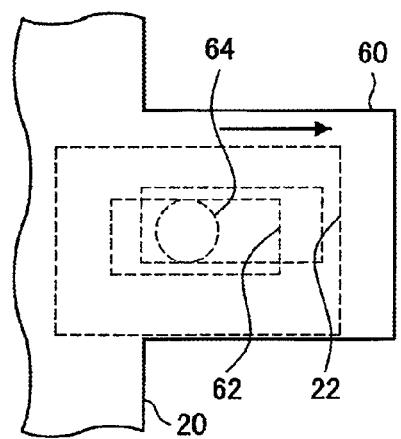
FIG. 7 is an enlarged plan view of a part of the conventional image shake correction device.

Exemplary embodiments of the present invention will now be described more fully with reference to the accompanying drawings. Like elements are denoted by like reference numerals and a detailed explanation thereof will not be given.

Figure 8:
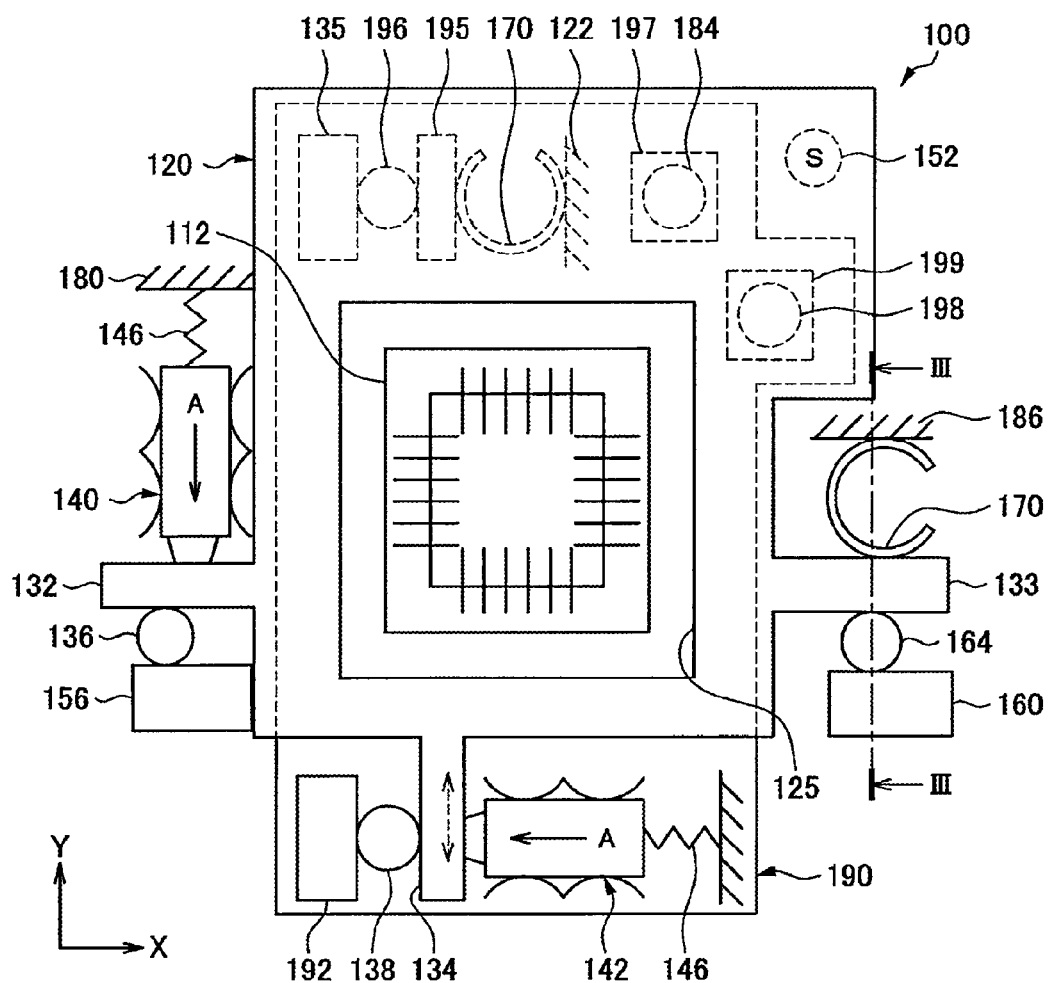
FIG. 8 is a plan view of an image shake correction device according to an embodiment of the present invention.

FIG. 8 is a plan view of an image shake correction device 100 according to an embodiment of the present invention.

A photographing apparatus employing the image shake correction device 100 includes a charged coupled device (CCD) image sensor 112, and an optical imaging system (not shown) forming an optical image of a subject on the CCD image sensor 112. The image shake correction device 100 operates according to the movement of the photographing apparatus to prevent image shake, and a detecting portion (not shown) detects the movement of the photographing apparatus and sends the detection result to the image shake correction device 100. The photographing apparatus may display a still image or a moving image.

The optical imaging system may be an optical system forming external optical information as an image on the CCD image sensor 112. The optical imaging system may include a lens unit, a zoom mechanism, a focus mechanism including a focus lens, a diaphragm mechanism limiting the direction or range of a light flux by changing the diameter of an aperture, and a cylindrical lens barrel in which lenses are accommodated.

The optical imaging system may include a single vision lens or a zoom lens. A motor driver for driving the zoom mechanism, the focus mechanism, and the diaphragm mechanism of the optical imaging system may be provided.

The detecting portion may be a gyro sensor or an acceleration sensor which detects vibrations caused by hand-shake or the like. The detecting portion sends the detection result regarding the movement of the photographing apparatus to the image shake correction device 100.

The image shake correction device 100 moves the CCD image sensor 112 included in the image shake correction device 100 on the basis of the detection result of the detecting portion to compensate for the movement of the photographing apparatus, thereby preventing shake of an image formed on the CCD sensor 112.

The image shake correction device 100 is driven by piezoelectric actuators 140 and 142, which are included in a driving force generating portion, and can move the CCD image sensor 112 in a direction parallel or substantially parallel to an image pickup surface, that is, an X-Y plane.

The CCD image sensor 112 includes elements each of which can convert an optical signal passing through the optical imaging system and incident on the image pickup surface into an electrical signal using photoelectric conversion. Although the CCD image sensor 112 acts as a photoelectric conversion device in FIG. 8, the present embodiment is not limited thereto and a complementary metal oxide semiconductor (CMOS) may be used as a photoelectric conversion device.

The image shake correction device 100 includes a base plate 180 fixed to a main body of the photographing apparatus, a CCD base 190 installed on the base plate 180 and allowing the CCD image sensor 112 to be installed thereon as an image pickup device, and a slider 120 disposed on the CCD base 190. The CCD base 190 and the slider 120 constitute an image pickup device stage.

In FIG. 8, the slider 120 can move along an X-axis with respect to the base plate 180. The CCD base 190 can move along a Y-axis with respect to the slider 120. The piezoelectric actuator 140, a support portion 156, a ball holder 160, and a support portion 186 are disposed on the base plate 180.

A concave groove 197 is formed in the base plate 180, a concave groove 199 is formed in the slider 120, a ball bearing 184 is inserted into the concave groove 197, and a ball bearing 198 is inserted into the concave groove 199. A protrusion 195 is formed on the CCD base 190. A long axis of the protrusion 195 is parallel or substantially parallel to the Y-axis.

A support portion 135, protrusions 132, 133, and 134, and a magnet holder 121 are formed on the slider 120. Long axes of the protrusions 132 and 133 are parallel or substantially parallel to the X-axis whereas a long axis of the protrusion 134 is parallel or substantially parallel to the Y-axis.

The image shake correction device 100 includes the driving force generating portion, a first elastically pressing portion, a guide portion, and a second elastically pressing portion which will be described later. The driving force generating portion includes the piezoelectric actuator 140 and the piezoelectric actuator 142. The piezoelectric actuator 140 moves the slider 120 along the X-axis, while the piezoelectric actuator 142 moves the CCD base 190 along the Y-axis.

The piezoelectric actuator 140 contacts the protrusion 132 of the slider 120 and applies a driving force as a frictional force to an operating portion of the protrusion 132. Likewise, the piezoelectric actuator 142 contacts the protrusion 134 of the slider 120 and applies a frictional driving force to an operating portion of the protrusion 134. The piezoelectric actuators 140 and 142 are disposed so that long axes of the piezoelectric actuators 140 and 142 are respectively perpendicular or substantially perpendicular to directions in which the slider 120 and the CCD base 190 move, and parallel or substantially parallel to the image pickup surface of the CCD image sensor 112.

The first elastically pressing portion includes compression coil springs 146 of the piezoelectric actuators 140 and 142. The compression coil spring 146 of the piezoelectric actuator 140 consistently presses the piezoelectric actuator 140 to the operating portion of the protrusion 132 to which the driving force of the piezoelectric actuator 140 is applied such that the piezoelectric actuator 140 and the protrusion 132 contact each other. The compression coil spring 146 of the piezoelectric actuator 142 consistently presses the piezoelectric actuator 142 to the operating portion of the protrusion 134 to which the driving force of the piezoelectric actuator 142 is applied such that the piezoelectric actuator 142 and the protrusion 134 contact each other.

V-shaped notches are formed in the protrusions 132 and 134 contacting the piezoelectric actuators 140 and 142 and in the support portion 156 and a support portion 192 respectively facing the protrusions 132 and 134. That is, although not shown, the V-shaped notches are formed in the protrusion 132 and the support portion 156 along the X-axis in which the slider 120 moves, and the V-shaped notches are formed in the protrusion 134 and the support portion 192 along the Y-axis in which the CCD base 190 moves.

A first ball bearing and a first fixing member are opposite to the driving force generating portion with the image pickup device stage therebetween. The first ball bearing includes a ball bearing 136 and a ball bearing 138, and the first fixing member includes the support portion 156 and the support portion 192.

Since the ball bearing 136 and the support portion 156 are opposite to the 15 piezoelectric actuator 140 and the ball bearing 138 and the support portion 192 are opposite to the piezoelectric actuator 142, the first fixing member bears an elastic pressure applied from the first elastically pressing portion through the image pickup device stage. The first ball bearing is inserted between the first fixing member and the image pickup device stage.

The guide portion includes a guide portion consisting of the ball holder 160 and a ball bearing 164 and a guide portion consisting of the support portion 135 and a ball bearing 196. The ball bearing 164 and the ball bearing 196 are included in a second ball bearing, and the ball holder 160 and the support portion 135 are included in a second fixing member.

The guide portion consisting of the ball holder 160 and the ball bearing 164 contacts the protrusion 133 of the slider 120 and limits a movement direction of the slider 120 to the X-axis. The guide portion consisting of the support portion 135 and the ball bearing 196 contacts the protrusion 195 of the CCD base 190 and limits a movement direction of the CCD base 190 to the Y-axis.

The second elastically pressing portion may include a C-shaped leaf spring 170 contacting the slider 120 and a C-shaped leaf spring 170 contacting the CCD base 190. The C-shaped leaf springs 170 receive elastic pressures applied in the same or substantially the same directions as directions in which the first elastically pressing portion elastically presses the piezoelectric actuators 140 and 142, and are adapted to bring the slider 120 into contact with the ball bearing 164 and bring CCD base 190 into contact with the ball bearing 196.

The C-shaped leaf springs 170 are disposed so that the directions in which the C-shaped leaf springs 170 elastically press the slider 120 and the CCD base 190 are respectively perpendicular or substantially perpendicular to the directions in which the slider 120 and the CCD base 190 move and parallel or substantially parallel to the image pickup surface of the CCD image sensor 112.

Figure 11:
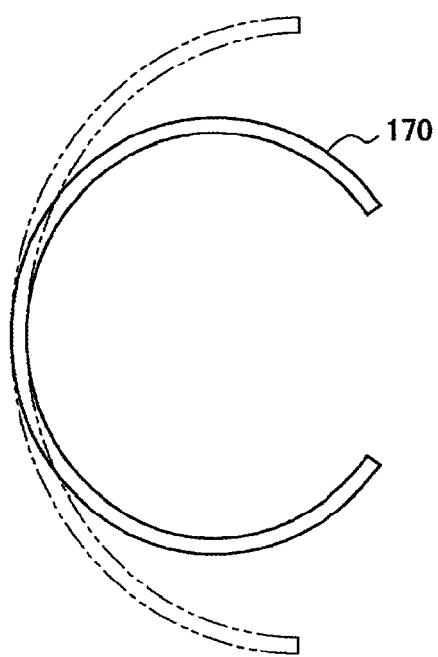
FIG. 11 is a plan view of the C-shaped leaf spring of FIG. 10 according to an embodiment of the present invention.

Each of the C-shaped leaf springs 170 marked by a solid line in FIG. 11 has a partially notched circular shape when the C-shaped leaf spring 170 is installed on the image shake correction device 100 and is viewed in a direction perpendicular or substantially perpendicular to the image pickup surface of the CCD image area 112. The C-shaped leaf spring 170 has a stretched shape before the C-shaped leaf spring 170 is installed on the image shake correction device 100. Since both ends of the C-shaped leaf spring 170 are pressed when the C-shaped leaf spring 170 is installed on the image shake correction device 100, the C-shaped leaf spring 170 applies an elastic pressure in a direction in which both the ends of the C-shaped leaf spring 170 are stretched.

Figure 10:
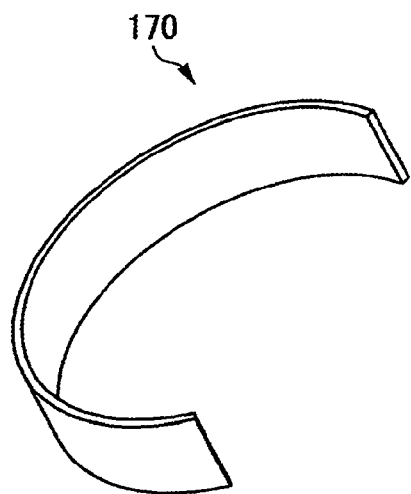
FIG. 10 is a perspective view of an example of a C-shaped leaf spring according to an embodiment of the present invention.
Figure 12:
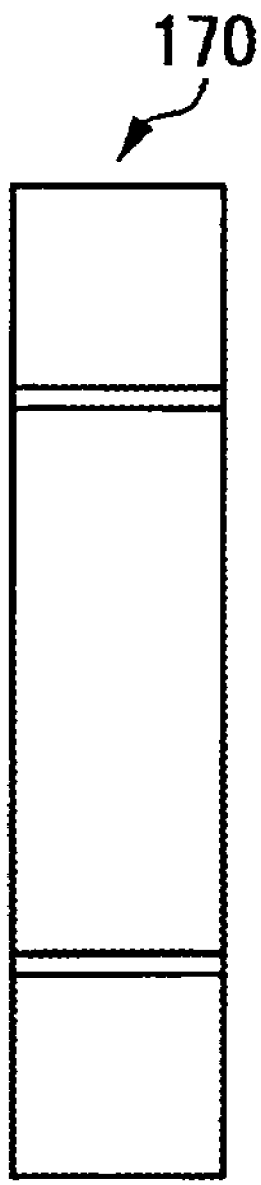
FIG. 12 is a side view of the C-shaped leaf spring of FIG. 10 according to an embodiment of the present invention.

FIGS. 10, 11, and 12 are a perspective view, a plan view, and a side view, respectively, of the C-shaped leaf spring 170 according to embodiments of the present invention.

A third fixing member is opposite to a contact portion between the second elastically pressing portion and the image pickup device stage with the second elastically pressing portion therebetween. The third fixing member may include the support portion 186, which contacts the C-shaped leaf spring 170 and is disposed on the base plate 180, and a support portion 122, which contacts the C-shaped leaf spring 170 and is disposed on the slider 120.

Figure 9:
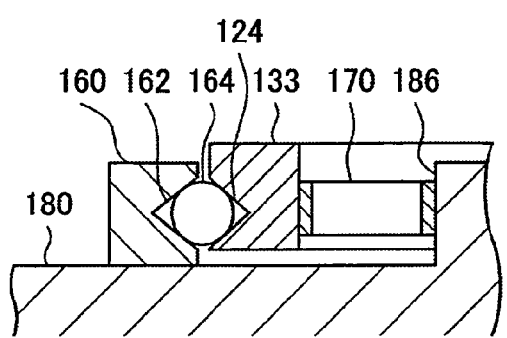
FIG. 9 is a cross-sectional view taken along line III-III in FIG. 8.

FIG. 9 is a cross-sectional view taken along line III-III of FIG. 8. As shown in FIG. 9, V-shaped grooves are formed in the protrusions 133 and 195 contacting the C-shaped leaf springs 170, and in the ball holder 160 and the support portion 135 facing the protrusions 133 and 195. The V-shaped notches are formed in the protrusion 133 and the ball holder 160 along the X-axis in which the slider 120 moves. Although not shown, the V-shaped notches are formed in the protrusion 195 and the support portion 135 along the Y-axis in which the CCD base 190 moves.

Figure 13:
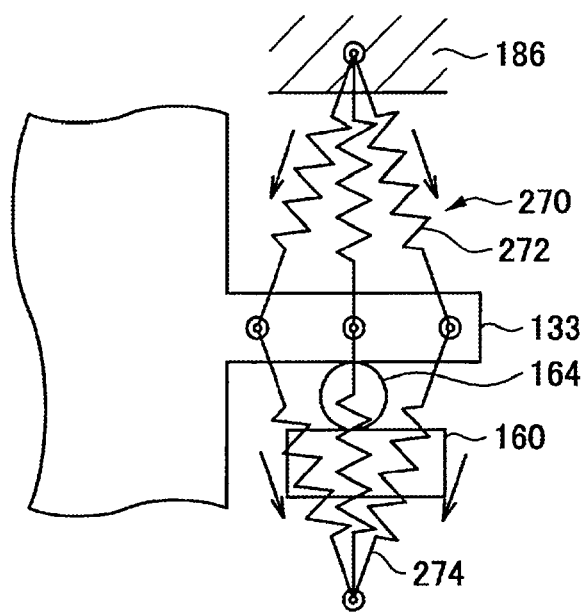
FIG. 13 is an enlarged plan view illustrating an example of a modification of a second elastically pressing portion of the image shake correction device of FIG. 8.
Figure 14:
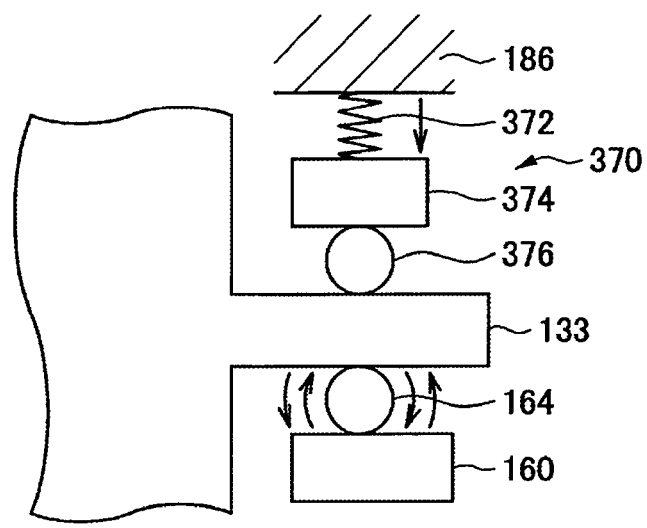
FIG. 14 is an enlarged plan view illustrating an example of another modification of the second elastically pressing portion of the image shake correction device of FIG. 8.

Modifications of the second elastically pressing portion will be explained with reference to FIGS. 13 and 14. FIGS. 13 and 14 are plan views illustrating modifications of the second elastically pressing portion.

Referring to FIG. 13, a second elastically pressing portion 270 may include a compression spring 272 and an extension spring 274. An end of the compression spring 272 is fixed to the support portion 186, and other end of the compression spring 272 is fixed to the protrusion 133. An end of the extension spring 274 is fixed to the protrusion 133, and the other end of the extension spring 274 may be fixed to the base plate 180.

Referring to FIG. 14, a second elastically pressing portion 370 may include a compression spring 372, a support portion 374, and a ball bearing 376. An end of the compression spring 372 is fixed to the support portion 186, and the other end of the compression spring 372 is fixed to the support portion 374.

The ball bearing 376 is inserted between the support portion 374 and the protrusion 133. The second elastically pressing portions 270 and 370 can elastically press the slider 120 toward the guide portion while moving the slider 120 along the X-axis, like the C-shaped leaf spring 170.

Figure 15:
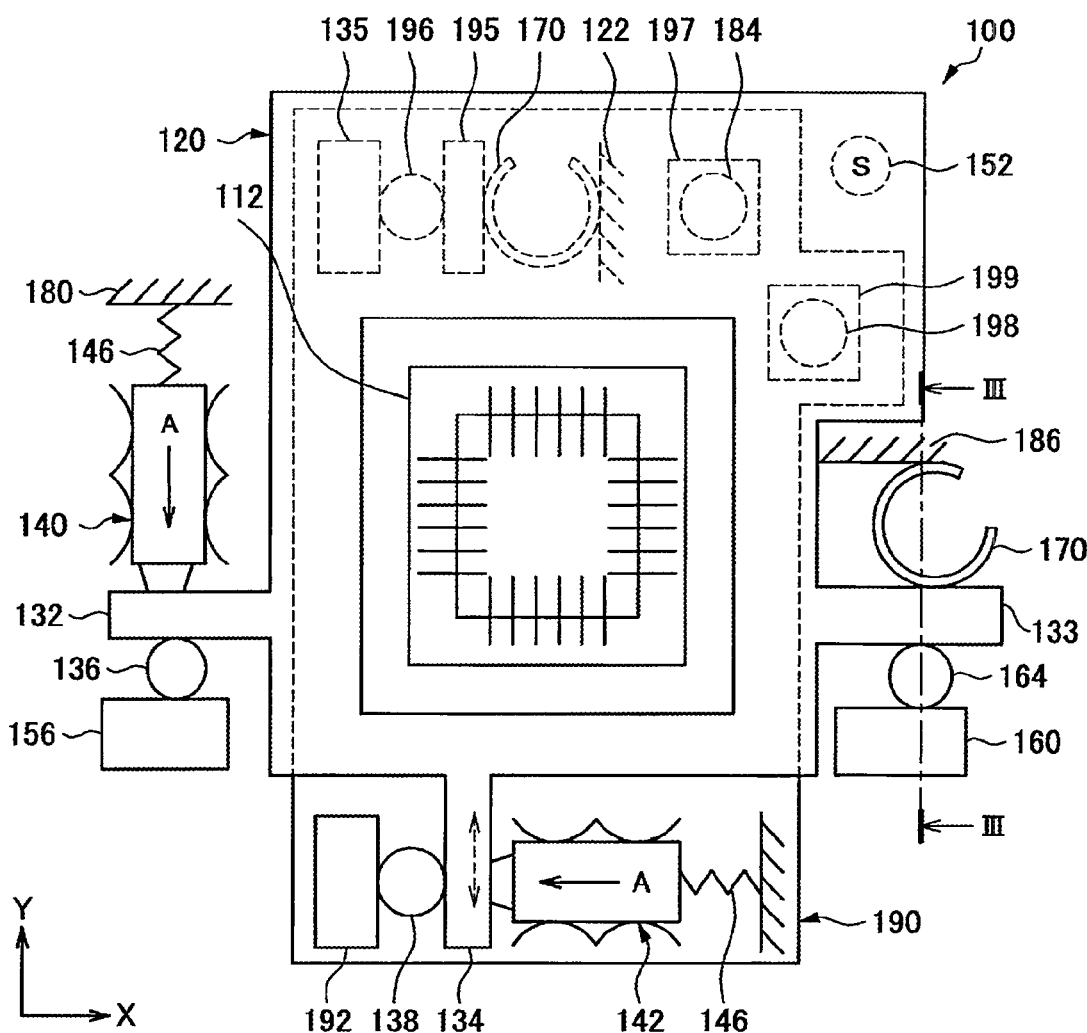
FIG. 15 is a plan view of the image shake correction device of FIG. 8 when a slider moves in a positive direction of an X-axis according to an embodiment of the present invention.

An example of the operation of the image shake correction device 100 will be described with reference to FIGS. 8 and 15. FIG. 15 is a plan view of the image shake correction device 100 of FIG. 8 when the slider 120 moves in a positive direction of the X-axis.

It is assumed that the detecting portion detects the vibrations of the photographing apparatus, the piezoelectric actuator 140 drives the slider 120, and the slider 120 moves in a negative direction of the X-axis as shown in FIG. 8.

In this case, the ball bearing 136 moves in the negative direction of the X-axis according to the movement of the slider 120. Therefore, when the ball bearing 136 moves in the negative direction of the X-axis and deviates from a virtual straight line extending from the long axis of the piezoelectric actuator 140, a rotating moment around the ball bearing 136 is caused by a pressure of the piezoelectric actuator 140.

The C-shaped leaf spring 170 elastically presses the slider 120 in the same or substantially the same direction as a direction in which the piezoelectric actuator 140 applies pressure, that is, in a direction in which the compression coil spring 146 presses elastically, such that the slider 120 contacts the ball bearing 164.

It is assumed that the detecting portion detects the vibration of the photographing apparatus, the piezoelectric actuator 140 drives the slider 120, and the slider 120 moves in the positive direction of the X-axis as shown in FIG. 15.

In this case, the ball bearing 136 moves in the positive direction of the X-axis, because the ball bearing 136 rolls when the slider 120 moves. Therefore, when the ball bearing 136 moves in the positive direction of the X-axis and deviates from the virtual straight line extending from the long axis of the piezoelectric actuator 140, a rotating moment around the ball bearing 136 is caused by a pressure of the piezoelectric actuator 140.

The C-shaped leaf spring 170 elastically presses the slider 120 in the same or substantially the same direction as a direction in which the pressure of the piezoelectric actuator 140 is applied, that is, in a direction in which the compression coil spring 146 elastically presses the piezoelectric actuator 140, such that the slider 120 contacts the ball bearing 164.

Accordingly, although the slider 120 moves in the positive or negative direction of the X-axis and the ball bearing 136 moves, the C-shaped leaf spring 170 consistently brings the slider 120 into contact with the ball bearing 164. Therefore, a gap caused by the movement of the slider 120 along the Y-axis is not formed, and thus the slider 120 can smoothly move along only the X-axis.

Although only the movement of the slider 120 along the X-axis has been described above, the same or substantially the same effect can be obtained when the piezoelectric actuator 142 operates to move the CCD base 190 along the Y-axis.

Since the ball bearing 164 is inserted into the substantially V-shaped grooves 124 and 162 in the direction in which the slider 120 moves, the slider 120 does not move along a Z-axis that is perpendicular or substantially perpendicular to the X and Y-axes, even though the C-shaped leaf spring 170 elastically presses the slider 120 toward the ball bearing 164. The CCD base 190 does not move along the Z-axis due to the same reason as described above.

Since the C-shaped leaf spring 170 elastically presses the slider 120 in a negative direction of the Y-axis, a frictional force is generated at a contact surface between the slider 120 and the C-shaped leaf spring 170. However, since the C-shaped leaf spring 170 has a partially notched circular shape when the C-shaped leaf spring 170 is installed on the image shake correction device 100, the C-shaped leaf spring 170 rotates between the ball holder 160 and the slider 120, even though the slider 120 moves along the X-axis. As a result, the frictional force generated at the contact surface between the slider 120 and the C-shaped leaf spring 170 is a rolling frictional force, not a sliding frictional force, and thus the C-shaped leaf spring 170 can reduce the frictional force. Hence, the slider 120 can smoothly move along the X-axis. The CCD base 190 can smoothly move along the Y-axis due to the same reason as described above.

An image shake correction device according to another embodiment of the present invention will now be described.

Figure 16:
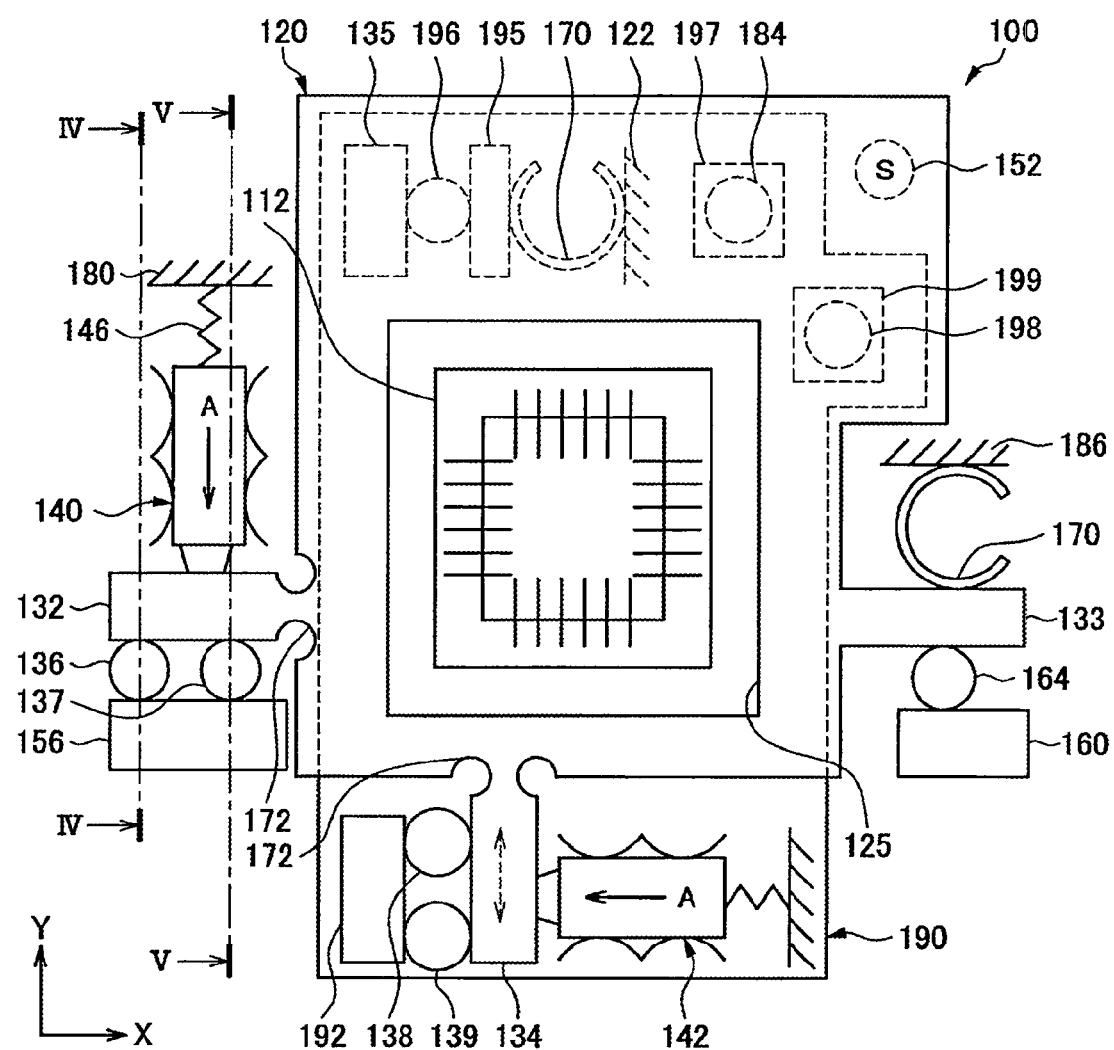
FIG. 16 is a plan view of an image shake correction device according to another embodiment of the present invention.
Figure 17:
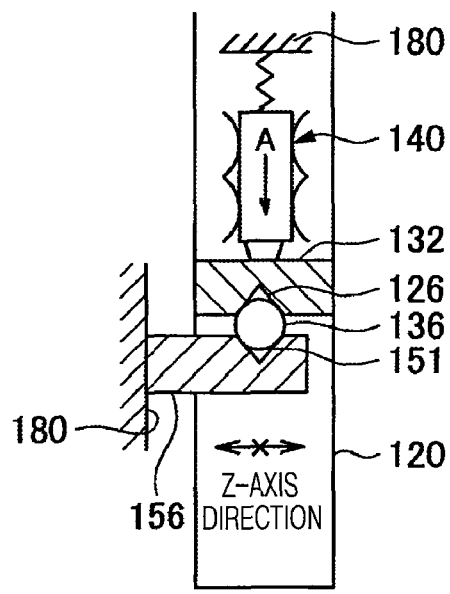
FIG. 17 is a cross-sectional view taken along line IV-IV of FIG. 16.
Figure 18:
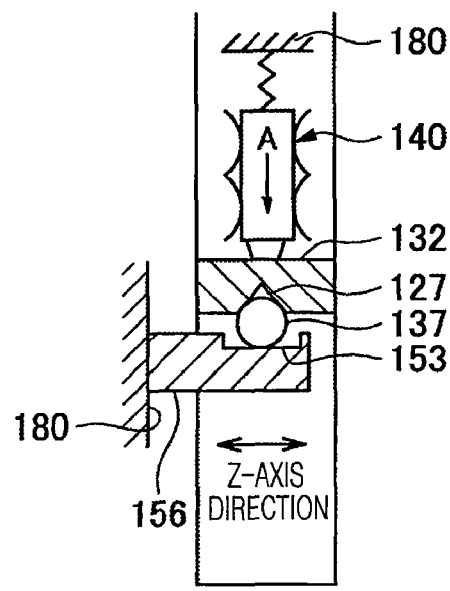
FIG. 18 is a cross-sectional view taken along line V-V of FIG. 16.
Figure 19:
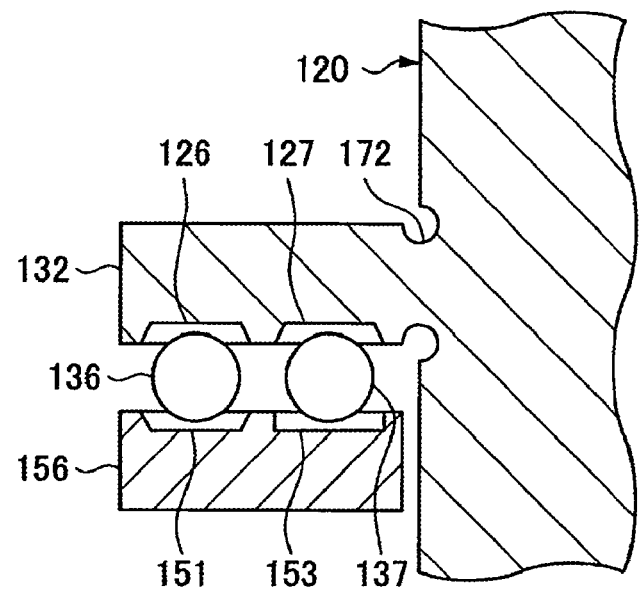
FIG. 19 is an enlarged cross-sectional view illustrating an example of a modification of a protrusion, a ball bearing, and a support portion of the image shake correction device of FIG. 16.
Figure 20:
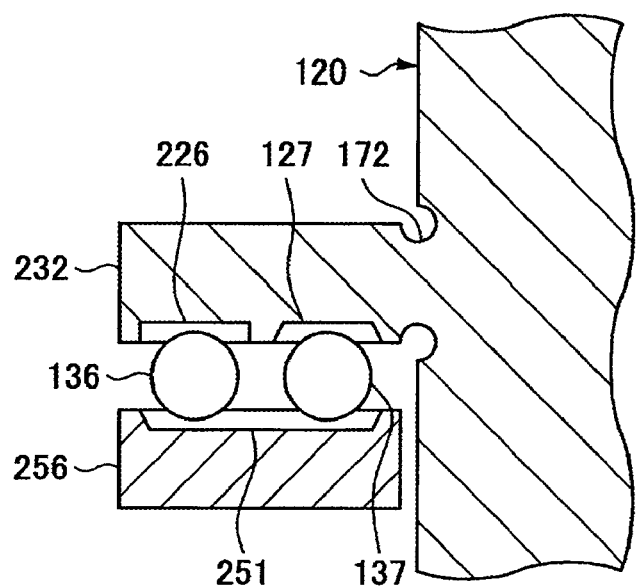
FIG. 20 is an enlarged cross-sectional view illustrating an example of another modification of a protrusion, a ball bearing, and a support portion of the image shake correction device of FIG. 16.
Figure 21:
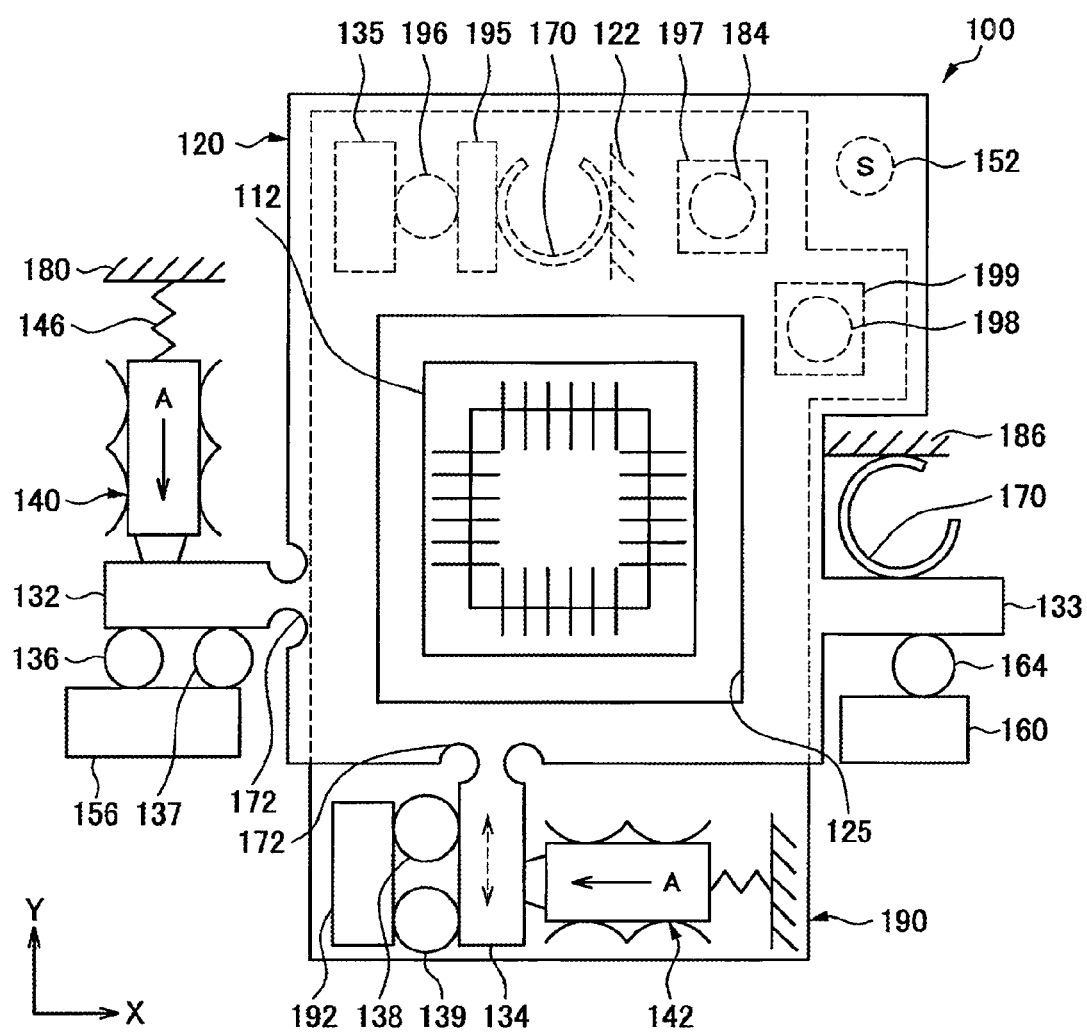
FIG. 21 is a plan view of the image shake correction device of FIG. 16 when a slider moves in a positive direction of an X-axis according to an embodiment of the present invention.
Figure 22:
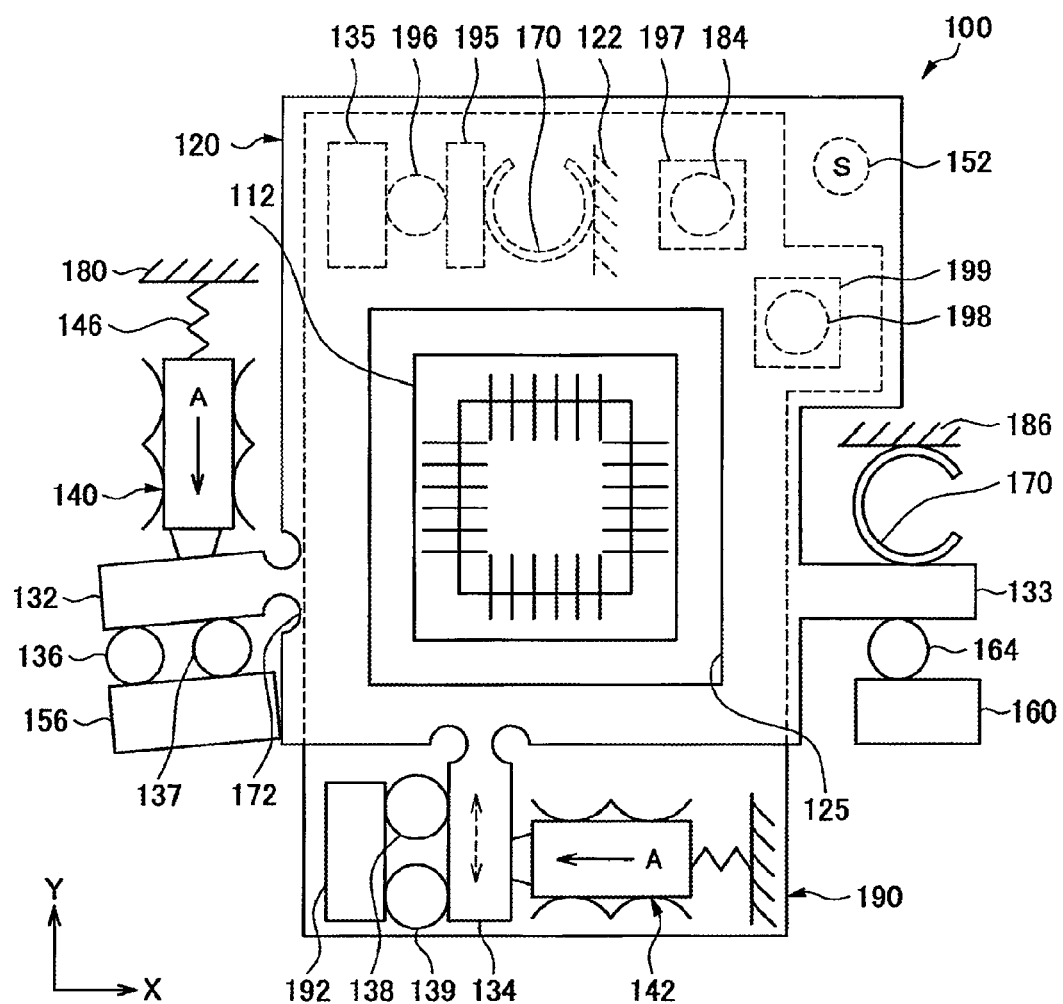
FIG. 22 is a plan view of the image shake correction device of FIG. 16 when a protrusion is bent according to an embodiment of the present invention.

FIG. 16 is a plan view of an example of an image shake correction device 100 according to another embodiment of the present invention. FIG. 17 is a cross-sectional view taken along line IV-IV of FIG. 16. FIG. 18 is a cross-sectional view taken along line V-V of FIG. 16. FIGS. 19 and 20 are cross-sectional views illustrating examples of modifications of a protrusion, ball bearings, and a support portion of the image shake correction device 100 of FIG. 16. FIG. 21 is a plan view of the image shake correction device 100 of FIG. 16 when the slider 120 moves in the positive direction of the X-axis. FIG. 22 is a plan view of the image shake correction device of FIG. 16 when the protrusion 132 is bent.

The image shake correction device 100 of FIG. 16 is different from the image shake correction device 100 of FIG. 8 in the constructions of the ball bearings 136 and 137 that are inserted between the protrusion 132 and the support portion 156 of the base plate 180, and of the ball bearings 138 and 139 that are inserted between the protrusion 134 and the CCD base 190. Also, the image shake correction device 100 of FIG. 16 is different from the image shake correction device 100 of FIG. 8 in that a region with a lower rigidity is formed at a contact portion between the protrusion 132 and the slider 120, and a region with a lower rigidity is formed at a contact portion between the protrusion 134 and the slider 120. Since the configurations and arrangement of the rest components of the image shake correction device 100 of FIG. 16 are the same or substantially the same as those of the image shake correction device 100 of FIG. 8, a detailed explanation thereof will not be given and differences therebetween will be described in detail.

Referring to FIG. 16, the ball bearings 136 and 137 inserted between the protrusion 132 and the support portion 156 of the base plate 180 are included in a first ball bearing. The ball bearings 136 and 137 are disposed so that a virtual straight line extending from the long axis (central axis in the longitudinal direction) of the piezoelectric actuator 140 is located between the center lines of the ball bearing 136 and the ball bearing 137.

Accordingly, a rotating moment is caused by a pressure of the piezoelectric actuator 140 between the ball bearings 136 and 137. Therefore, in both cases, when the slider 120 moves in the negative direction of the X-axis as shown in FIG. 16 and when the slider 120 moves in the positive direction of the X-axis as shown in FIG. 21, the slider 120 is not bent due to the pressure of the piezoelectric actuator 140. As a result, the slider 120 can move smoothly along the X-axis.

Referring to FIG. 17, the ball bearing 136 is inserted between a V-shaped groove 126 formed in the protrusion 132 and a V-shaped groove 151 formed in the support portion 156. Referring to FIG. 18, the ball bearing 137 is inserted between a V-shaped groove 127 formed in the protrusion 132 and a concave groove 153 formed in the support portion 156 and having a bottom surface parallel or substantially parallel to the Z-axis.

The ball bearing 137 can move in the concave groove 153 along the Z-axis that is perpendicular or substantially perpendicular to the direction in which the slider 120 moves. Also, the ball bearing 164 is inserted between the V-shaped grooves 162 and 124 as described above with reference to FIG. 8.

Therefore, since the ball bearing 136 and the ball bearing 164 are fixed at two points, the slider 120 does not move along the Z-axis. Although the ball bearing 137 can move in the concave groove 153 along the Z-axis perpendicular or substantially perpendicular to the direction in which the slider 120 moves, since the three ball bearings are arranged along the X-axis, the slider 120 can be prevented from moving along the Z-axis by using the two ball bearings.

When the ball bearings 136 and 137 are inserted between the slider 120 and the support portion 156, only one concave groove may be formed. That is, the concave groove 153 may be formed in the support portion 156 of the ball bearing 137 as shown in FIGS. 18 and 19, or a concave groove 226 may be formed in the protrusion 232 of the ball bearing 136 as shown in FIG. 20.

The V-shaped grooves may be separately formed, like the V-shaped grooves 126 and 127 shown in FIGS. 17 through 19, or may be combined, like a V-shaped groove 251 shown in FIG. 20. The region with the lower rigidity than that of other regions of the slider 120 is formed at the contact portion between the protrusion 132 and the slider 120. The region with the lower rigidity may include notched portions 172 as shown in FIG. 16. Each of the notched portions 172 may have an arc shape formed by notching the slider 120 at an intersection between the protrusion 132 and the slider 120.

Since the contact portion between the protrusion 132 and the slider 120 has a width narrower than that of the protrusion 132 along the Y-axis, the contact portion is more flexible than other regions of the slider 120. As a result, vibrations transferred from the piezoelectric actuator 140 through the protrusion 132 to the slider 120 can be reduced. Resonating is prevented because the vibrations of the piezoelectric actuator 140 can be kept away from the vibration mode of the slider 120.

When the number of ball bearings disposed on the side of the piezoelectric actuator 140 (the driving force generating portion) and the C-shaped leaf spring 170 (the second elastically pressing portion) is more than 3, the ball bearings may not be aligned due to tolerance of components, etc. However, since the region with the lower rigidity is formed at the contact portion between the protrusion 132 and the slider 120, the notched portion 172 formed at the contact portion between the protrusion 132 and the slider 120 can be bent as shown in FIG. 22. As a result, the misalignment of the ball bearings due to the tolerance of components, etc., can be avoided.

The same effect can be obtained from the region with the lower rigidity formed at the contact portion between the protrusion 134 and the slider 120 as that obtained from the region with the lower rigidity formed at the contact portion between the protrusion 132 and the slider 120.

An image shake correction device according to another embodiment of the present invention will now be explained with reference to FIGS. 23 and 24.

Figure 23:
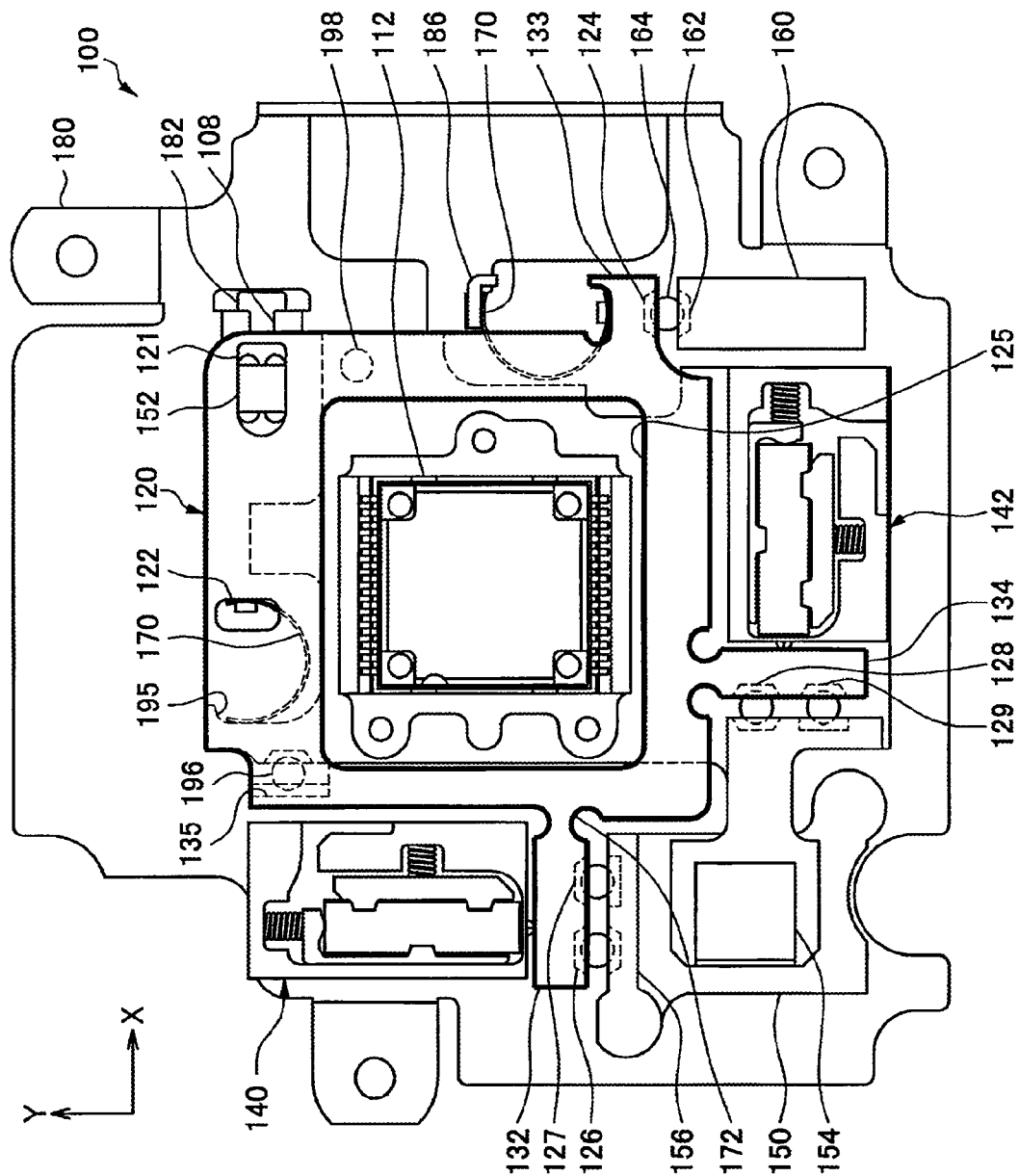
FIG. 23 is a plan view of an image shake correction device according to another embodiment of the present invention.
Figure 24:
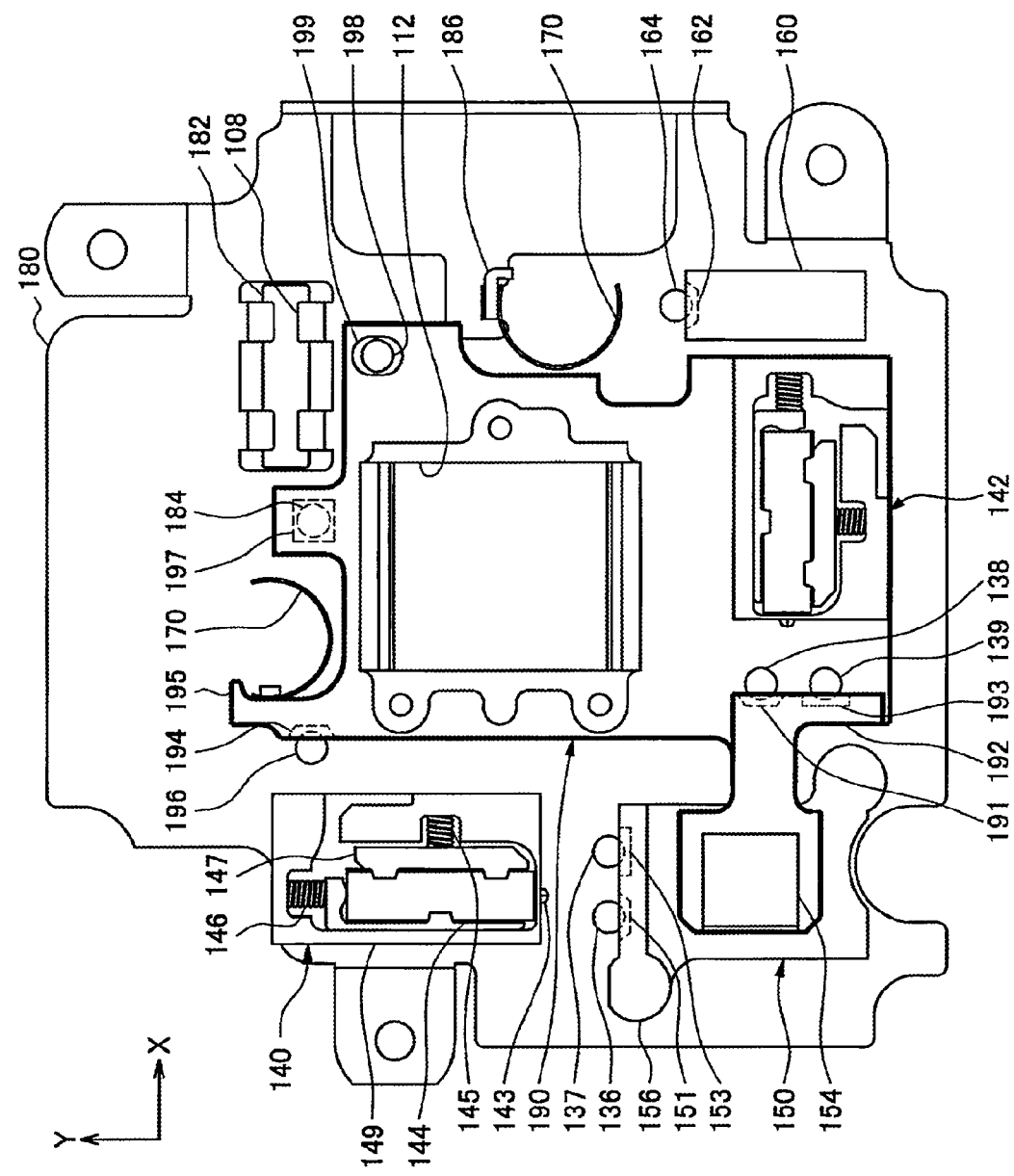
FIG. 24 is a plan view illustrating an example of a modification of the image shake correction device of FIG. 23 from which a slider is removed.

FIGS. 23 and 24 are plan views of an image shake correction device 100 according to another embodiment of the present invention. FIG. 23 shows the image shake correction device 100 from which flexible printed circuits (FPCs) connected to the CCD image sensor 112 and an image pickup device cover plate are removed. FIG. 24 shows the image shake correction device 100 of FIG. 23 from which the slider 120 is removed.

The configurations and arrangement of the slider 120 and the CCD base 190 of FIGS. 23 and 24 are the same or substantially the same as those described with reference to FIG. 16. The piezoelectric actuators 140 and 142, a sensor holder 150, a magnet 154, a metal plate 182, and a magnet 152 will now be explained.

The piezoelectric actuator 140 is disposed over the base plate 180 so that the long axis of the piezoelectric actuator 140 is parallel or substantially parallel to the Y-axis, and the piezoelectric actuator 142 is disposed over the CCD base 190 so that the long axis of the piezoelectric actuator 142 is parallel or substantially parallel to the X-axis.

The piezoelectric actuators 140 and 142 will be first explained in detail. Since the piezoelectric actuator 140 and the piezoelectric actuator 142 have the same or substantially the same function, the piezoelectric actuator 140 will be exemplarily explained. Referring to FIG. 24, the piezoelectric actuator 140 includes a piezoelectric element 144, compression coil springs 145 and 146, an SP contact 147, and an FPC (not shown).

The piezoelectric elements 144 of the piezoelectric actuators 140 and 142 include active portions 143 which are formed at front ends of the piezoelectric elements 144 and contact the protrusions 132 and 134 of the slider 120. The piezoelectric element 144 comprises input portions (not shown) to which sine waves generated by modulating square waves using pulse width modulation (PWM).

The compression coil springs 145 and 146 included in an elastically pressing portion elastically press the piezoelectric element 144 with the SP contact 147 therebetween. The SP contact 147, which is a member bent by 90 degrees into an L-shape, contacts the piezoelectric element 144 and the compression coil springs 145 and 146.

The FPC connects the piezoelectric element 144 and a circuit (not shown) disposed on the photographing apparatus. The FPC applies a driving voltage from a power source (not shown) disposed on the photographing apparatus to the piezoelectric element 144.

A cover portion (not shown) and a base portion 149 are disposed on the piezoelectric actuator 140. The piezoelectric element 144, the compression coil springs 145 and 146, and the SP contact 147 are received in a space defined by the cover portion and the base portion 149.

The piezoelectric element 144 is elastically pressed in the negative direction of the Y-axis by the compression coil spring 146 to contact the protrusion 132. Therefore, the protrusion 132 is also elastically pressed in the negative direction of the Y-axis by the compression coil spring 146, and the ball bearings 136 and 137 are inserted between the protrusion 132 and the support portion 156.

The piezoelectric element 144 operates in an extension mode and a flexure mode when the sine waves generated by modulating the square waves using PWM are applied. When the extension mode and the flexure mode are combined, the active portion 143 of the piezoelectric element 144 moves elliptically.

Since the active portion 143 of the piezoelectric element 144 is brought into contact with the protrusion 132 of the slider 120 by the compression coil spring 146, the slider 120 moves along the X-axis perpendicular or substantially perpendicular to the long axis of the piezoelectric actuator 140 due to a frictional force between the slider 120 and the active portion 143.

When the piezoelectric actuator 140 operates to move the slider 120 in the positive direction of the X-axis, the ball bearing 136 inserted between the protrusion 132 and the support portion 156 rotates. Friction loss generated when the slider 120 moves can be reduced by the rotation of the ball bearing 136.

Since the grooves 126 and 151 of the protrusion 132 and the support portion 156 have V-shaped cross sections and the ball bearing 136 is inserted between the protrusion 132 and the support portion 156, the slider 120 cannot move along the Z-axis in FIG. 16. Therefore, shaking of the slider 120 along the Z-axis can be prevented.

The sensor holder 150 and the magnet 154 disposed on the CCD base 190 will now be explained. The sensor holder 150 includes a Hall position sensor (not shown).

The sensor holder 150 is installed on the base plate 180. The magnet 154 is installed on the CCD base 190 over the sensor holder 150 to correspond to the Hall position sensor. The Hall position sensor is connected to the circuit disposed on the photographing apparatus with the FPC therebetween.

A position of the photographing apparatus moved along the X and Y-axes is detected by the Hall position sensor installed in the sensor holder 150 and the magnet 154, and a servo control for image shake correction is performed.

The metal plate 182 and the magnet 152 disposed on the slider 120 will now be explained. Referring to FIG. 24, the metal plate 182 is a metal panel member extending along the X-axis, and is fixed to the base plate 180 by a support portion 108.

Referring to FIG. 23, the magnet 152 is a rectangular plate-type magnet mounted on the magnet holder 121 of the slider 120. The magnet 152 and the magnet holder 121 are disposed over the metal plate 182. When the magnet 152 and the metal plate 182 are assembled with each other, the slider 120 and the base plate 180 can be prevented from being separated from each other.

Since the slider 120 moves along the X-axis, even though the magnet 152 moves, the metal plate 182 extends along the X-axis and thus the metal plate 182 is always disposed under the magnet 152. As a result, a magnetic force is always applied to the slider 120 along the Z-axis that is perpendicular or substantially perpendicular to the X and Y-axes.

As described above, the photographing apparatus according to the present invention can stably move the image pickup device stage and prevent image shake with high precision.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A photographing apparatus comprising:
an image pickup device for converting light emitted to an image pickup surface into an electrical signal using photoelectric conversion;
an image pickup device stage supporting the image pickup device and moving the image pickup device in a direction substantially parallel to the image pickup surface;
a driving force generating portion for driving the image pickup device stage by applying a frictional driving force to an operating portion of the image pickup device stage and moving the image pickup device stage in the direction substantially parallel to the image pickup surface;

a guide portion contacting the image pickup device stage and limiting the direction in which the image pickup device stage moves;

a first elastically pressing portion elastically pressing the driving force generating portion to consistently bring the driving force generating portion into contact with the operating portion of the image pickup device stage to which the driving force of the driving force generating portion is applied; and a second elastically pressing portion elastically pressing the image pickup device stage in substantially the same direction as a direction in which the first elastically pressing portion elastically presses the driving force generating portion to bring the image pickup device stage into contact with the guide portion.

2. The photographing apparatus of claim 1, wherein the driving force generating portion is disposed so that a long axis of the driving force generating portion is substantially perpendicular to the direction in which the image pickup device stage moves, and is substantially parallel to the image pickup surface of the image pickup device, and the second elastically pressing portion is disposed so that the direction in which the second elastically pressing portion elastically presses the image pickup device stage is substantially perpendicular to the direction in which the image pickup device stage moves, and is substantially parallel to the image pickup surface of the image pickup device.

3. The photographing apparatus of claim 1, further comprising:

a first fixing member for receiving an elastic pressure applied through the image pickup device stage from the first elastically pressing portion; and a first ball bearing inserted between the first fixing member and the image pickup device stage, wherein the guide portion comprises a second fixing member for receiving an elastic pressure applied through the image pickup device stage from the second elastically pressing portion and a second ball bearing inserted between the second fixing member and the image pickup device stage, wherein substantially V-shaped notches are formed in the direction in which the image pickup device stage moves, in opposite surfaces of the first fixing member and the image pickup device stage between which the first ball bearing is inserted and in opposite surfaces of the second fixing member and the image pickup device stage between which the second ball bearing is inserted.

4. The photographing apparatus of claim 1, wherein the second elastically pressing portion has a partially notched circular shape when viewed in a direction substantially perpendicular to the image pickup surface, wherein an outer peripheral surface of a circular-shaped second elastically pressing portion brings the image pickup device stage into contact with the guide portion by elastically pressing the image pickup device stage in substantially the same direction as the direction in which the first elastically pressing portion elastically presses the driving force generating portion.

5. The photographing apparatus of claim 4, wherein the second elastically pressing portion is inserted between the image pickup device stage and a third fixing member that is opposite to a contact portion between the second elastically pressing portion and the image pickup device stage, and the circular-shaped second elastically pressing portion rotates between the image pickup device stage and the third fixing member according to the movement of the image pickup device stage.

6. The photographing apparatus of claim 1, wherein the image pickup device stage comprises a protrusion, wherein the protrusion has an operating surface which is substantially parallel to the direction in which the image pickup device stage moves, and the driving force generating portion contacts the operating surface of the protrusion to which the driving force of the driving force generating portion is applied.

7. The photographing apparatus of claim 6, wherein a region with a lower rigidity than that of other regions of the image pickup device stage is formed at a contact portion between the protrusion and the image pickup device stage.

8. The photographing apparatus of claim 7, wherein the region with the lower rigidity has a notched shape.

9. The photographing apparatus of claim 3, wherein the first ball bearing comprises two balls arranged in the direction in which the image pickup device stage moves.

10. The photographing apparatus of claim 9, wherein one of the two balls is inserted into a substantially V-shaped notch formed in opposite surfaces of the first fixing member and the image pickup device stage, and the remaining one of the two balls moves in a direction substantially perpendicular to the direction in which the image pickup device stage moves and is inserted into a substantially concave notch formed in the opposite surfaces of the first fixing member and the image pickup device stage in the direction in which the image pickup device stage moves.

11. The photographing apparatus of claim 9, wherein a virtual straight line extending from a long axis of the driving force generating portion, which is substantially perpendicular to the direction in which the image pickup device stage moves, is located between the center lines of the two balls.

12. The photographing apparatus of claim 10, wherein a virtual straight line extending from a long axis of the driving force generating portion, which is substantially perpendicular to the direction in which the image pickup device stage moves, is located between the center lines of the two balls.

13. An image shake correction device, for use with a photographing apparatus, the image shake correction device comprising:

a guide portion contacting an image pickup device stage of the photographing apparatus and limiting a direction in which the image pickup device stage moves;

a first elastically pressing portion elastically pressing a driving force generating portion, which drives the image pickup device stage of the photographing apparatus, to consistently bring the driving force generating portion into contact with an operating portion of the image pickup device stage to which the driving force of the driving force generating portion is applied; and a second elastically pressing portion elastically pressing the image pickup device stage in substantially the same direction as a direction in which the first elastically pressing portion elastically presses the driving force generating portion to bring the image pickup device stage into contact with the guide portion.

14. The image shake correction device of claim 13, wherein the driving force generating portion is disposed so that a long axis of the driving force generating portion is substantially perpendicular to the direction in which the image pickup device stage moves, and is substantially parallel to an image pickup surface of the image pickup device, and the second elastically pressing portion is disposed so that the direction in which the second elastically pressing portion elastically presses the image pickup device stage is substantially perpendicular to the direction in which the image pickup device stage moves, and is substantially parallel to the image pickup surface of the image pickup device.

15. The image shake correction device of claim 13, further comprising:
   a first fixing member for receiving an elastic pressure applied through the image pickup device stage from the first elastically pressing portion; and
   a first ball bearing inserted between the first fixing member and the image pickup device stage,
   wherein the guide portion comprises a second fixing member for receiving an elastic pressure applied through the image pickup device stage from the second elastically pressing portion and a second ball bearing inserted between the second fixing member and the image pickup device stage,
   wherein substantially V-shaped notches are formed in the direction in which the image pickup device stage moves, in opposite surfaces of the first fixing member and the image pickup device stage between which the first ball bearing is inserted and in opposite surfaces of the second fixing member and the image pickup device stage between which the second ball bearing is inserted.

16. The image shake correction device of claim 13, wherein the second elastically pressing portion has a partially notched circular shape when viewed in a direction substantially perpendicular to the image pickup surface,
   wherein an outer peripheral surface of a circular-shaped second elastically pressing portion brings the image pickup device stage into contact with the guide portion by elastically pressing the image pickup device stage in substantially the same direction as the direction in which the first elastically pressing portion elastically presses the driving force generating portion.

17. The image shake correction device of claim 16, wherein the second elastically pressing portion is inserted between the image pickup device stage and a third fixing member that is opposite to a contact portion between the second elastically pressing portion and the image pickup device stage, and the circular-shaped second elastically pressing portion rotates between the image pickup device stage and the third fixing member according to the movement of the image pickup device stage.

18. The image shake correction device of claim 13, wherein the image pickup device stage comprises a protrusion,
   wherein the protrusion has an operating surface which is substantially parallel to the direction in which the image pickup device stage moves, and
   the driving force generating portion contacts the operating surface of the protrusion to which the driving force of the driving force generating portion is applied.

19. The image shake correction device of claim 18, wherein a region with a lower rigidity than that of other regions of the image pickup device stage is formed at a contact portion between the protrusion and the image pickup device stage.

20. The image shake correction device of claim 19, wherein the region with the lower rigidity has a notched shape.

21. The image shake correction device of claim 15, wherein the first ball bearing comprises two balls arranged in the direction in which the image pickup device stage moves.

22. The image shake correction device of claim 21, wherein one of the two balls is inserted into a substantially V-shaped notch formed in opposite surfaces of the first fixing member and the image pickup device stage, and
   the remaining one of the two balls moves in a direction substantially perpendicular to the direction in which the image pickup device stage moves and is inserted into a substantially concave notch formed in the opposite surfaces of the first fixing member and the image pickup device stage in the direction in which the image pickup device stage moves.

23. The image shake correction device of claim 21, wherein a virtual straight line extending from a long axis of the driving force generating portion, which is substantially perpendicular to the direction in which the image pickup device stage moves, is located between the center lines of the two balls.

* * * * *